United States Patent Office 2,743,284
Patented Apr. 24, 1956

2,743,284

PROCEDURE FOR THE RACEMIZATION OF OPTICAL ISOMERS, PARTICULARLY OF α-HYDROXY-β,β-DIMETHYL-γ-BUTYROLACTONE

Howard C. Klein, Brooklyn, N. Y., and Roland Kapp, Newark, N. J., assignors to Nopco Chemical Company, Harrison, N. J., a corporation of New Jersey No Drawing. Application November 19, 1952,
Serial No. 321,516

7 Claims. (Cl. 260—343.6)

The present invention relates generally to a process for the racemization of optical isomers containing an activated hydrogen in the alpha position. More particularly, this invention relates to the racemization of the optical isomers of α-hydroxy-β,β-dimethyl-γ-butyrolactone.

The subject of optical activity, always of interest from the theoretical aspect, becomes of great industrial importance where one of a pair of the optical isomers of a particular substance is valuable and the other is comparatively worthless. Such a situation is encountered in the case of α-hydroxy-β,β-dimethyl-γ-butyrolactone. L-α-hydroxy-β,β-dimethyl-γ-butyrolactone finds wide use at present in the synthesis of the physiologically active d-pantothenic acid or its salts by reaction with β-alanine or its salts. The condensation of d-α-hydroxy-β,β-dimethyl-γ-butyrolactone with β-alanine or its derivatives, on the other hand, gives the physiologically inactive laevorotatory isomer of pantothenic acid. Hence, it has been the practice to resolve the racemic mixture of d- and l-lactones to recover the desired l-lactone prior to reaction with β-alanine. The other product of the resolution, d-lactone, is substantially worthless, and it has been for some time the endeavor of the art to provide for the utilization of this useless by-product. Thus, it has been proposed to racemize the d-lactone by heating it with an aqueous solution of a sodium salt in an autoclave under pressure. It has also been proposed to conduct the heating in the conjoint presence of various catalytic agents and solvents. These methods have, however, been subject to certain disadvantages, such as the use of costly pressure equipment and the necessity of removing the solvent from the racemic mixture of d- and l-lactones. It is evident, therefore, that the development of a simple yet effective racemization procedure is extremely desirable. The present invention makes such a process available to the art.

It is an object of this invention to provide a process for the racemization of optical isomers containing an activated hydrogen in the alpha position.

It is another object of this invention to provide a process for the racemization of optical isomers of α-hydroxy-β,β-dimethyl-γ-butyrolactone.

It is a further object of this invention to provide a process for the conversion of d-α-hydroxy-β,β-dimethyl-γ-butyrolactone to the more desirable laevo-isomer.

It is an object of this invention to provide a process for the most complete utilization of a substance existing in enantiomorphous forms.

It has been discovered in accordance with the present invention that the above and other objects are obtainable through the use of heat alone as the racemization agent. That the seemingly simple expedient of heating the optical isomer should result in its racemization is a most surprising discovery. While the temperature and time of heating can be varied over wide ranges, the achievement of optimum results and of a practical commercial process requires that certain limitations on the conditions under which the racemization is effected be observed. The applicants have found that heating the optical isomer at any temperature between the melting point and the boiling point thereof will bring about racemization. However, where the temperatures which are used are too low, the rate of racemization may be so slight as to be without practical significance. In such cases the time of heating required to materially increase the degree of racemization would be so great that the efficiency of the process would be greatly impaired. The applicants have found that commercially practicable results are obtained by heating the optical isomer at a temperature of from about 170° C. to about 240° C. for periods of from about 5 minutes to about 4 hours, the period of heating in general varying inversely with the temperature at which racemization is effected. In the preferred embodiment of the invention the optical isomer is heated at a temperature of about 235–240° C. for a period of from 5 to 10 minutes. While the process will be described with particular reference to the racemization of l-α-hydroxy-β,β-dimethyl-γ-butyrolactone, it is obvious that the process can be as successfully applied to the racemization of the d-lactone.

The following specific examples serve to illustrate the present invention but they are not to be construed as limiting in any way the scope of the invention.

Example I 25 parts of l-α-hydroxy-β,β-dimethyl-γ-butyrolactone, $(\alpha)_D = -49.8$, were heated at about 145° C. for a period of about 1½ hours. At the end of this period the lactone had $(\alpha)_D = -49.5$, indicating that only 1% racemization had taken place.

Example II 25 parts of d-α-hydroxy-β,β-dimethyl-γ-butyrolactone, $(\alpha)_D = +48.9$, were heated at a temperature of about 145–148° C. for a period of about 3½ hours. At the end of this period the d-lactone had an $(\alpha)_D = +48.2$, indicating that racemization had been effected to the extent of only 3.6%.

Example III 25 parts of the l-lactone, $(\alpha)_D = -48.8$, were heated at about 145–148° C. for a period of about 16 hours. At the end of this period the lactone had $(\alpha)_D = -44.8$, equivalent to a racemization of 10.4%.

A comparison of Examples I, II and III shows that extending the duration of the heat treatment where the temperature used effects only a slow rate of racemization does not materially increase the degree of racemization. It is evident that the length of time which would be required to achieve a practical degree of racemization at the temperatures used in these examples would be so great as to render the procedure impractical from an industrial viewpoint.

Example IV 25 parts of the l-lactone, $(\alpha)_D = -49.8$, were heated at a temperature of about 171° C. for a period of about 2 hours. At the end of this time the lactone had $(\alpha)_D = -31.2$, indicating that racemization had taken place to the extent of 37.6%.

Example V 150 parts of the l-lactone, $(\alpha)_D = -49.8$, were brought up to 235–240° C. and held at this temperature for 10 minutes. At the end of this period 142.5 parts of the racemized lactone were recovered by distillation in vacuo, having $(\alpha)_D = -0.44$, equivalent to 99.12% racemization.

Example VI 50 parts of the l-lactone, $(\alpha)_D = -49.8$, were brought up to about 240° C. and held there for a period of 5 minutes. At the end of this period the lactone had $(\alpha)_D=0.00$, indicating that 100% racemization had been effected.

Example VII 50 parts of the d-lactone, $(\alpha)_D=+49.9$, were brought to a temperature of about 228–230° C. and held at this temperature for a period of 3½ hours. Specimens were withdrawn after certain periods of heating and the $(\alpha)_D$ obtained. The results are set forth below:

| Heating Period | $(\alpha)_D$ | Percent Racemization |
| --- | --- | --- |
| 10 minutes | $(\alpha)_D=+39.9$ | 20.2 |
| 30 minutes | $(\alpha)_D=+30.0$ | 40.0 |
| 60 minutes | $(\alpha)_D=+23.1$ | 53.8 |
| 120 minutes | $(\alpha)_D=+13.9$ | 72.2 |
| 210 minutes | $(\alpha)_D=+7.2$ | 85.6 |

From a consideration of Examples V, VI and VII it can readily be determined that the most favorable conditions for effecting racemization are those wherein the temperature of heating is from about 225° C. to about 240° C. and the period of heating is from about 5 minutes to about 4 hours, the length of heat treatment varying inversely with the temperature of heating. It is also clear from a consideration of the other examples in this application that the applicants' invention is not limited in scope to the conditions noted above since the applicants have shown that the use of lower temperatures will effect racemization.

The racemic mixtures of d- and l-lactones obtained by the methods illustrated in the foregoing examples can be readily resolved by any of the well known resolution procedures to yield the desired, valuable isomer. Thus, the racemic mixture of optical isomers can be converted into diastereoisomers by the addition of an optically active base, and the resultant salts separated by fractional crystallization. When the separation is complete the optically active base is split off by treatment with a strong alkali or acid yielding the pure enantiomorphic forms. The particular method of resolution, however, however, forms no part of the present invention which is concerned solely with the racemization procedure.

The advantages of the procedure illustrated in the examples recited above are at once obvious. There are no foreign substances, such as solvents or catalytic agents, present during the course of the reaction and, hence, there is no necessity for providing for the separation and removal of such materials. The simplified procedure which the applicants have discovered, therefore, accomplishes the highly desirable ends of eliminating both previously necessary materials and previously essential steps. The greatly increased productivity which can be realized through the practice of the applicants' invention is self-evident. It is also apparent that the present invention will result in more satisfactory working conditions since, by removing the need for using a solvent, it eliminates a material which is always a potential health and safety hazard. The applicants' invention also enables one to avoid the necessity for relactonization with acid, with the subsequent steps of neutralization, extraction, drying, etc., characteristic of the procedures previously known to the art. The economies of time, effort, and cost which can be obtained through the practice of this invention are apparent from the consideration of the disclosure and no further discussion of these advantages is believed necessary.

Although the invention has been illustrated and described in its preferred embodiment, it will be obvious that various changes may be made therein without departing from the spirit of the invention or the scope of the appended claims.

Having described our invention, what we claim to be new and wish to secure by Letters Patent is:

1. A process for the racemization of an optical isomer selected from the group consisting of d-α-hydroxy-β,β-dimethyl-γ-butyrolactone and l-α-hydroxy-β,β-dimethyl-γ-butyrolactone which comprises heating said optical isomer at a temperature of from about 170° C. to about 240° C. for a period of from about five minutes to about four hours.

2. A process for the racemization of an optical isomer selected from the group consisting of d-α-hydroxy-β,β-dimethyl-γ-butyrolactone and l-α-hydroxy-β,β-dimethyl-γ-butyrolactone which comprises heating said optical isomer at a temperature of from about 225° C. to about 240° C. for a period of from about five minutes to about four hours.

3. A process for the racemization of an optical isomer selected from the group consisting of d-α-hydroxy-β,β-dimethyl-γ-butyrolactone and l-α-hydroxy-β,β-dimethyl-γ-butyrolactone which comprises heating said optical isomer at a temperature of from about 235° C. to about 240° C. for a period of from about five to about ten minutes.

4. A process according to claim 3 in which the optical isomer is d-α-hydroxy-β,β-dimethyl-γ-butyrolactone.

5. A process according to claim 4 in which the heating is conducted at a temperature of about 240° C. and for a period of about five minutes.

6. A process according to claim 3 in which the optical isomer is l-α-hydroxy-β,β-dimethyl-γ-butyrolactone.

7. A process according to claim 6 in which the heating is conducted at a temperature of about 240° C. and for a period of about five minutes.

References Cited in the file of this patent

UNITED STATES PATENTS

| | | |
| --- | --- | --- |
| 2,434,061 | Weijlard | Jan. 6, 1948 |
| 2,463,734 | Beckmann | Mar. 8, 1949 |

OTHER REFERENCES

Gilman: Org. Chem., vol. 1, John Wiley and Sons, N. Y. (1938), pp. 176–77.

Whitmore: Org. Chem., 2nd ed., May 1951, D. Van Nostrand Co., pp. 400–01.

Houben: Die Methoden der Org. Chem., vol. 2, 3rd ed., G. Thieme, Leipzig, 1925, pp. 1090–96; 1104.

Cohen: Org. Chem., 4th ed., part II, pages 195–97, Longmans, Green and Co., N. Y. (1923).